United States Patent [19]

Choi

[11] Patent Number: 4,764,941

[45] Date of Patent: Aug. 16, 1988

[54] DIGITAL FRAME SYNCHRONIZER

[75] Inventor: DooWhan Choi, Salem, N.H.

[73] Assignee: American Telephone and Telegraph Company, AT&T Bell Laboratories, Murray Hill, N.J.

[21] Appl. No.: 53,284

[22] Filed: May 22, 1987

[51] Int. Cl.[4] .............................................. H04L 7/00
[52] U.S. Cl. .................................... 375/112; 370/102
[58] Field of Search .............. 375/106, 111, 112, 118, 375/119; 370/102

[56] References Cited

U.S. PATENT DOCUMENTS

| 3,564,414 | 2/1971 | Ebert | 375/112 |
| 4,095,053 | 6/1978 | Duttweiler et al. | 370/102 |
| 4,347,620 | 8/1982 | Black et al. | 375/112 |
| 4,649,536 | 3/1987 | Krinock | 370/102 |
| 4,661,966 | 4/1987 | Schreiner | 375/112 |

FOREIGN PATENT DOCUMENTS 162646 12/1980 Japan .................... 375/112

OTHER PUBLICATIONS

"Jitter due to Pulse Stuffing Synchronization", by Chow, IEEE Transactions on Communications, Jul. 1973.

"Jitter Characteristics of Pulse Stuffing Synchronization", by Matsuura et al., pp. 259–264, 1968, IEEE.

"Digital Multiplex Impairments", Transmission Systems for Communications, 5th Ed., Bell Telephone Laboratories, 1982.

J. McEachern et al., "Threshold Modulation for Jitter Reduction", Contribution to T1 Standards Project-T1x1.3, Standards Project: JWC/87-001, SONET Jitter and Wander Liaison, Jan. 30, 1987.

T. Moore, "Jitter Analysis of Asynchronous Payload Mappings", Contribution to T1 Standards Project-T1x1.4, Standards Project: T1x1.4/86-447, Rates and Formats for Fiber Optic Network Interfaces, Nov. 12, 1986.

D. Duttweiler, "Waiting Time Jitter", BSTJ, vol. 51, No. 1, Jan. 1972, pp. 165–207.

Primary Examiner—Philip H. Leung
Assistant Examiner—Derek S. Jennings
Attorney, Agent, or Firm—Thomas Stafford

[57] ABSTRACT

A desired positive fractional stuffing ratio is obtained in a frame synchronizer for a digital signal having a channel frame format that included two stuffing bit positions to obtain either positive or negative stuffing. The fractional stuffing ratio is obtained by controllably increasing the duration of a first predetermined number of intervals during which data bits are written into the synchronizer and, then, by controllably decreasing the duration of a second predetermined number of intervals during which data bits are written into the synchronizer. A data bit is forced to be included in one of the stuffing bit positions occurring during each of the first predetermined number of intervals and a non-data bit is forced to be included in one of the stuffing bit positions occurring during each of the second predetermined number of intervals.

20 Claims, 6 Drawing Sheets

FIG.6 ed number of intervals, a data bit is forced to be included in one of the stuffing bit positions of the frames in a predetermined number of multi-frames forming a so-called super-frame. For a second predetermined number of intervals, a non-data bit is forced to be included in one of the stuffing bit positions of the frames in a predetermined number of multi-frames of the super-frame.

DIGITAL FRAME SYNCHRONIZER

TECHNICAL FIELD

The present invention is directed toward digital transmission systems and, more particularly, to the reduction of waiting time jitter.

BACKGROUND OF THE INVENTION

Figure 1:
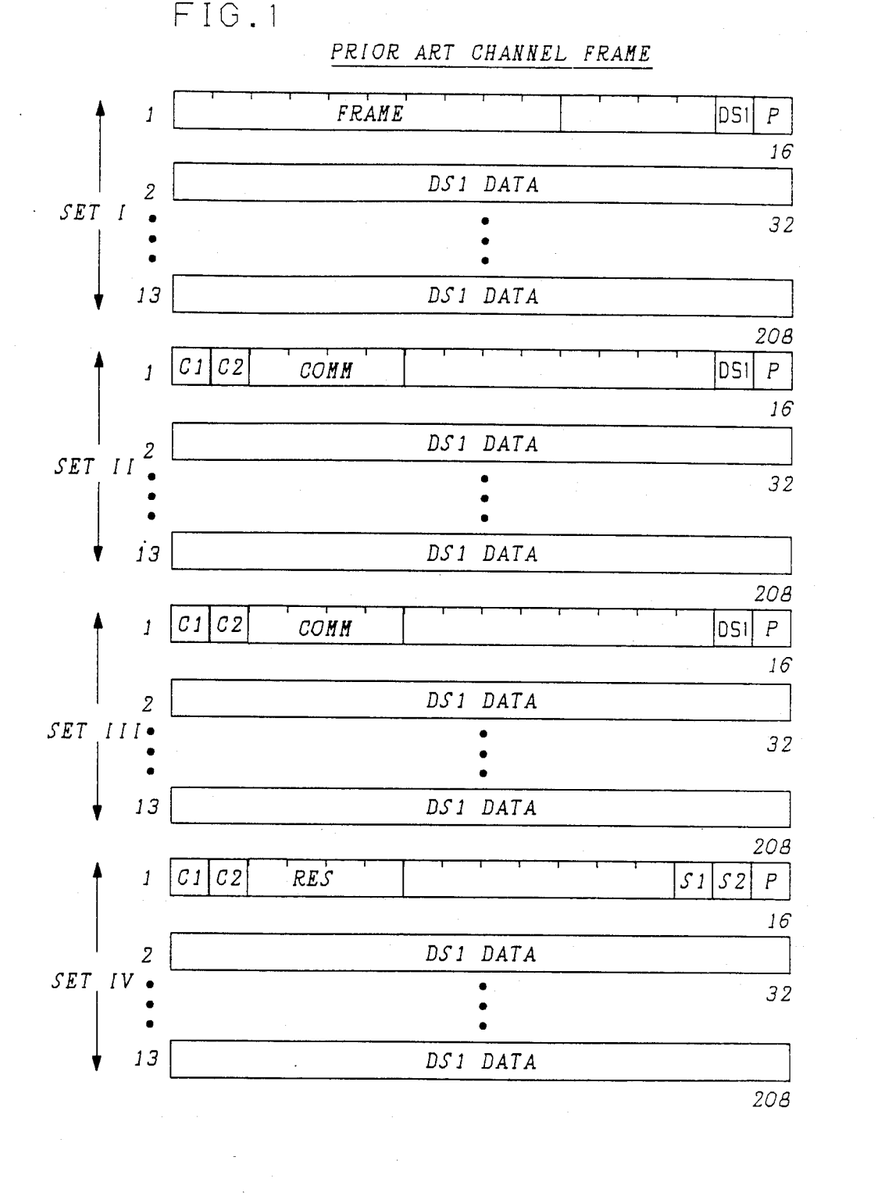
FIG. 1 shows a prior channel frame format including stuffing bit positions to effect positive and negative stuffing.

In the transmission of digital signals, bit stuffing has become a common way of synchronizing lower bit rate signals for transmission at a higher bit rate. One bit stuffing arrangement employs two stuffing bit positions in each channel frame and is commonly referred to as positive and negative stuffing. One such channel frame employing positive and negative stuffing is shown in FIG. 1 of the Drawing and includes the two stuffing bit positions S1 and S2. Generation of such a channel frame is disclosed in copending U.S. patent application Ser. No. 769,427, filed Aug. 26, 1985. When the incoming data bit rate is at its nominal rate, one of the stuffing bit positions includes a data bit and the other a stuffing bit. If the incoming data bit rate is greater than the nominal rate, then occasionally, as required, both of the stuffing bit positions S1 and S2 include data bits. This is commonly referred to as negative stuffing. On the other hand, if the incoming data bit rate is less than the nominal rate, then occasionally, as required, both of stuffing bit positions S1 and S2 include stuffing bits. This is commonly referred to as positive stuffing.

A serious problem with such a positive and negative stuffing arrangement is that the so-called waiting time jitter caused by the bit stuffing is too large. Waiting time jitter resulting from bit stuffing is described in *Transmission Systems for Communications*, 5th Edition, 1982, Bell Telephone Laboratories, Incorporated, pages 692–699. Also see an article by D. L. Duttweiler entitled "Waiting Time Jitter", *Bell System Technical Journal*, Vol. 51, No. 1, January 1972, pages 165–207, and an article entitled "Jitter Characteristics of Pulse Stuffing Synchronization", *IEEE Proceedings International Conference on Communications*, June 1968, pages 259–264. In the positive and negative stuffing arrangement, a nominal stuffing ratio of one (1) results since one of the stuffing bit positions nominally includes a stuffing bit. Thus, as explained in the above-cited articles, the so-called waiting time jitter value is very large, which is extremely undesirable.

It is known that a positive stuffing scheme which causes the stuffing ratio to be reasonably greater than zero (0) and less than one (1) will significantly reduce waiting time jitter.

It is also known that a synchronous stuffing arangement does not generate waiting time jitter.

SUMMARY OF THE INVENTION

The problem of waiting time jitter associated with a so-called positive and negative bit stuffing arrangement is overcome, in accordance with an aspect of the invention, in a digital frame synchronizer for generating frames having a prescribed frame interval by controllably adjusting the number of incoming data bits accommodated in each of the frames so that a desired fractional stuffing ratio reasonably greater than zero (0) and less than one (1) is obtained.

More specifically, the fractional stuffing ratio is obtained by controllably increasing the duration of a first predetermined number of intervals during which data bits are written into a sychronizer and, then, by controllably decreasing the duration of a second predetermined number of intervals during which data bits are written into the synchronizer. A data bit is forced to be included in one of the stuffing bit positions occurring during each of the first predetermined number of intervals and a non-data bit is forced to be included in one of the stuffing bit positions occurring during each of the second predetermined number of intervals.

In one embodiment of the invention, a desired fractional stuffing ratio for obtaining an acceptable value of waiting time jitter is realized by employing a so-called two stage stuffing arrangement. A first stuffing stage includes an asynchronous stuffing arrangement having a desired fractional stuffing ratio for generating so-called intermediate frames. A second stuffing stage includes a synchronous stuffing arrangement for generating desired output frames. A predetermined number, q, of the intermediate frames forms an intermediate multi-frame. For a first predetermined number, p, of intermediate frames in the multi-frame, one of the two stuffing bit positions is forced always to include a data bit. The other stuffing bit position can be either stuffed or not. For a second predetermined number, q-p, of intermediate frames, one of the two stuffing bit positions is eliminated;, thereby decreasing the data transport capacity of the frame by one bit. The other stuffing bit position can be either stuffed or not. Therefore, the stuffing ratio for the p intermediate frames becomes one (1), and the stuffing ratio for the q-p intermediate frames becomes zero (0).

The desired fractional stuffing ratio, p/q, for each frame in the two stage embodiment is obtained, in accordance with an aspect of the invention, by controllably increasing the nominal number of incoming data bits accommodated for the first predetermined number of intermediate frames and, then, controllably decreasing the nominal number of incoming data bits accommodated for the second predetermined number of intermediate frames of an intermediate multi-frame.

The increase and decrease in the nominal number of data bits accommodated in the frames of the intermediate multi-frame are realized by forcing one of the stuffing bit positions to include a data bit in the first predetermined number of intermediate frames, by eliminating one of the stuffing bit positions in the second predetermined number of intermediate frames, and by employing an intermediate clock rate that is less than a desired output clock rate in a prescribed manner for generating the intermediate frames so that the interval of the intermediate multi-frame is equal to the interval of an output multi-frame also having a total number, q, of frames. Desired output frames are obtained from the second stuffing stage by inserting a non-data bit in the one of the stuffing bit positions in the second predetermined number of intermediate frames that was eliminated in the intermediate multi-frame and, then, reading the frames out at the output clock rate.

In another embodiment of the invention, an elastic store arrangement is advantageously employed to obtain a fractional stuffing ratio that yields an acceptable waiting time jitter value. The desired fractional stuffing ratio is obtained, in part, by employing a multi-frame format having a predetermined total number, q, of frames. This multi-frame format is identical to the output multi-frame format described above and generated by the two stage stuffing arrangement. For a first predetermined number, p, of frames in the multi-frame, one of the two stuffing bit positions is forced to include a data bit. The other stuffing bit position can be either stuffed or not. For a second predetermined number, q-p, of frames, one of the two stuffing bit positions is forced to include a non-data bit, thereby decreasing the data transport capacity of the frame by one bit. The other stuffing bit position can be either stuffed or not. Then, the desired fractional stuffing ratio is obtained, in accordance with an aspect of the invention, by increasing in a prescribed manner the number of incoming data bits written into the elastic store during the first predetermined number, p, of frames and by decreasing in a prescribed manner the number of incoming data bits written into the elastic store during the second predetermined number, q-p, of frames of the multi-frame. Consequently, a desired fractional stuffing ratio of p/q is obtained.

The increase or decrease in the data written into the elastic store for each frame is realized, in accordance with an aspect of the invention, by controllably adjusting the elastic store write address latching time relative to the elastic store read address latching time. The latched write address and the latched read address of the elastic store for a frame are used to make a decision either to stuff or not for the frame. For the first predetermined number of frames, the occurrence of latching the write address is delayed relative to the occurrence of latching the read address, thereby increasing the interval that data is written into the elastic store for each of the first predetermined number of frames. The decrease in the data written into the elastic store during the second predetermined number of frames is realized by advancing the delayed occurrence of latching the write address back toward the original undelayed position relative to the occurrence of latching the read address. At the end of the multi-frame the net delay of the write address latching time relative to the read address latching time vanishes and, then, the write address latching time delay-and-advance cycle can be reinitiated for the next subsequent multi-frame.

BRIEF DESCRIPTION OF THE DRAWING

The invention will be more clearly understood from the following detailed description of illustrated embodiments when taken in conjunction with the appended figures, in which.

DETAILED DESCRIPTION

As indicated above, FIG. 1 illustrates a so-called channel frame format that includes two stuffing bit positions, namely, S1 and S2, which provide for positive and negative stuffing. Applicant's invention is directed toward obtaining a so-called forced positive stuffing ratio in such a channel frame format but is not limited to the specific format shown in FIG. 1. For simplicity and clarity of description, an example is being described herein which relates to the well-known DS1 Pulse Code Modulation (PCM) digital format which is transmitted at a nominal bit rate of 1.544 Mbps. The output bit rate, in this example, is 1.664 Mbps with a channel frame rate of 2 KHz. Thus, in the channel frame format of FIG. 1, the total number of bits per frame including overhead bits is N=832 bits and the nominal number of incoming data bits per frame is M=772 bits. However, it should be understood that applicant's unique invention is equally applicable to other transmission bit rates and frame formats.

Figure 2:
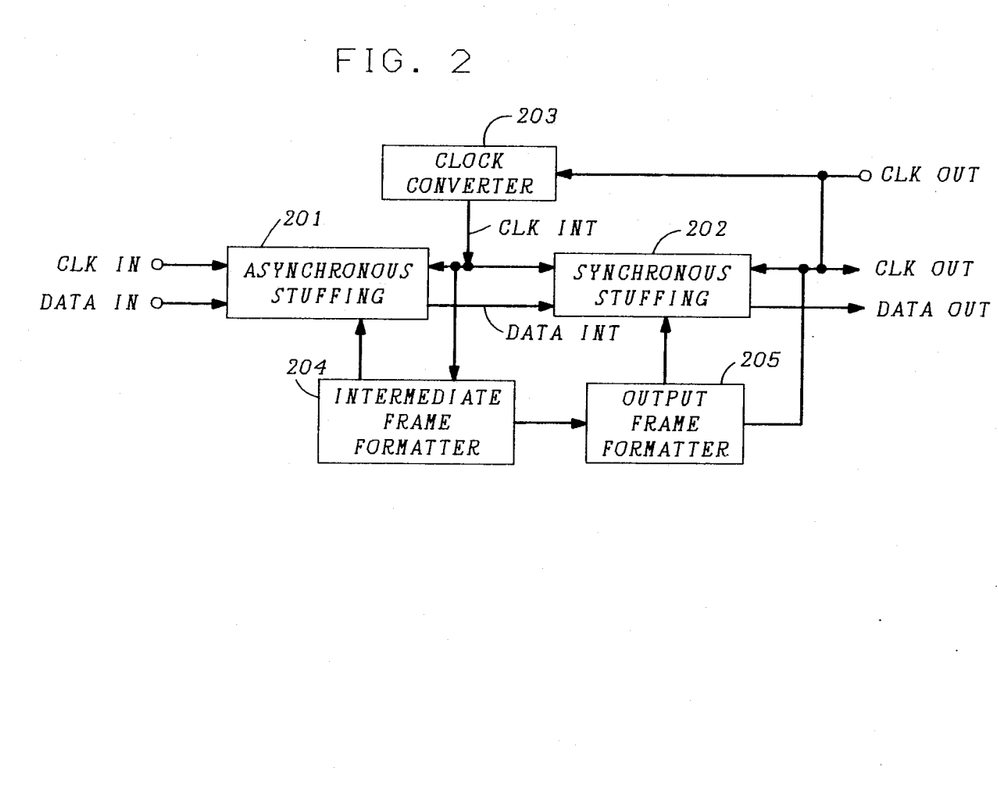
FIG. 2 depicts in simplified block diagram form details of an embodiment of the invention that includes two stages of stuffing to obtain a desired fractional stuffing ratio which yields an acceptable waiting time jitter value.

FIG. 2 shows in simplified block diagram form one embodiment of applicant's unique invention for obtaining a desired fractional positive stuffing ratio in a so-called pulse stuffing synchronizer. It is again noted that such a synchronizer is typically employed to synchronize lower bit rate digital signals for transmission at a higher bit rate. Accordingly, shown are an asynchronous stuffing unit 201 which provides a first stage of stuffing for generating so-called intermediate frames and which provides a desired fractional stuffing ratio. Then, a synchronous stuffing unit 202 provides a second stage of stuffing for generating output frames having a desired format. Also shown are clock converter 203 which generates an intermediate clock (CLKINT) signal, employed in the embodiment of the invention, intermediate frame formatter 204 and output frame formatter 205.

Thus, in this example, a DS1 PCM signal is supplied to the DATA IN input and the DS1 1.544 MHz clock signal (CLKIN) is supplied to the CLK IN input of asynchronous stuffing unit 201. Also supplied to asynchronous stuffing unit 201 is an intermediate clock signal CLKINT, which in this example has a rate of 1.663 MHz and is used to generate the intermediate frames, in accordance with an aspect of the invemntion, as will be explained hereinafter. The CLKINT clock signal is also supplied to intermediate frame formatter 204 which controls asynchronous stuffing unit 201 to generate the intermediate frame format also to be described hereinafter. Such asynchronous stuffing units which may be advantageously employed in this embodiment of the invention to generate applicant's unique intermediate frame format are known in the art. See, for example, the articles cited above entitled "Waiting Time Jitter" and "Jitter Characteristics of Pulse Stuffing Synchronization".

Synchronous stuffing unit 202 is supplied with the intermediate frame output of asynchronous stuffing unit 201 and CLKINT for generating, under control of output frame formatter 205, an output from intermediate frame formatter 204 and an output clock (CLKOUT) signal, output frames having a desired format and a desired fractional stuffing ratio. Such synchronous stuffing units are also known in the art.

Clock converter 203 is employed to generate, in this example, CLKINT of 1.663 MHz from the CLKOUT of 1.664 MHz.

Figure 3:
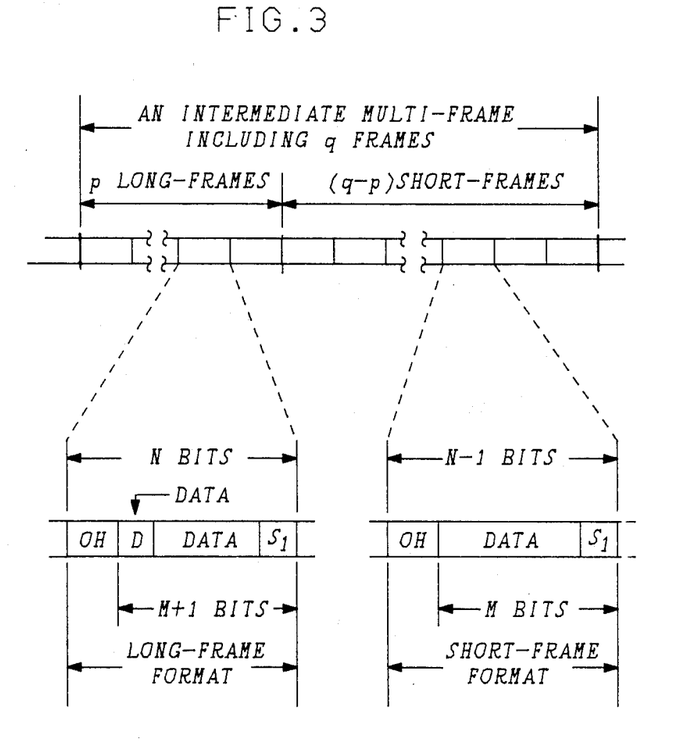
FIG. 3 illustrates in simplified form an intermediate multi-frame useful in describing the embodiment of FIG. 2.

The frame synchronizer shown in FIG. 2 generates a desired asynchronous stuffing ratio which is approximately p/q. The desired stuffing ratio is obtained by employing asynchronous stuffing unit 201, under control of CLKINT and intermediate formatter 204, to asynchronously stuff the incoming DS1 data signal into an intermediate frame format at a reduced rate, CLKINT, relative to a desired output rate, CLKOUT. Then, the output from asynchronous stuffing unit 201, in the intermediate frame format shown in simplified form in FIG. 3, is synchronously stuffed in synchronous stuffing unit 202, under control of output frame formatter 205 in conjunction with intermediate frame formatter 204 and CLKOUT to generate an output multi-frame format, as shown in simplified form in FIG. 4. Output frame formatter 205 is responsive to an output from intermediate frame formatter 204 for controllably inserting a non-data bit in the appropriate stuffing bit position in the so-called x-frames of the output frame format of FIG. 4.

Operation of asynchronous stuffing unit 201 and synchronous stuffing unit 202 is to evenly distribute the effect of p frames in which a data bit is included in one of the stuffing bit positions over the q frames of the multi-frame. The overall interval of the intermediate multi-frame is equal to the overall interval of the output multi-frame. However, the individual frame intervals in the intermediate frames are longer in duration for the first predetermined number of frames and shorter in duration for the second predetermined number of frames than those in the output multi-frame. As shown in FIG. 3, the p frames, i.e., the long frames, have a data transport capacity of M+1 bits because one of the stuffing bit positions, namely D (FIG. 3), is forced to carry a data bit and the q-p frames, i.e., the short frames, have a data transport capacity of M bits because one of the stuffing bit positions has been eliminated. Similarly, the p frames each have a total of N bits, while the q-p frames each have a total of N−1 bits.

Figure 4:
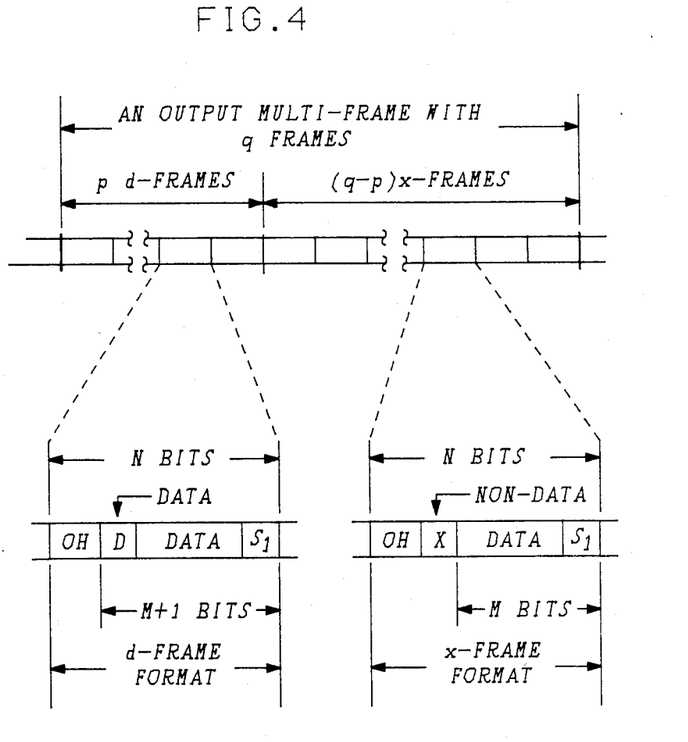
FIG. 4 illustrates in simplified form an output multi-frame also useful in describing the embodiments of FIG. 2 and FIG. 5.

Then, an output multi-frame including q frames, as shown in FIG. 4, is generated by synchronous stuffing unit 202 at the desired output clock rate CLKOUT. The d-frame of the output multi-frame corresponds to a frame as shown in FIG. 4 in which a stuffing bit position includes a data bit D and the x-frame corresponds to a frame as shown in FIG. 4 in which a stuffing bit position includes a non-data bit X.

In general, for the embodiment of the invention shown in FIG. 2, the intermediate clock rate is $$CLKINT = CLKOUT - \left(1 - \frac{p}{q}\right)FR \qquad (1)$$

where CLKINT is the intermediate clock rate, CLKOUT is the output clock rate, p is the number of long or d-frames, q is the total number of frames in the multi-frame and FR is the output frame rate. Thus, in this example, CLKOUT=1.644 MHz, p=1, q=2 and FR=2 KHz and, consequently, CLKINT=1.663 MHz.

The interval of the long frames as shown in FIG. 3 is increased to $$T_l = T_{FR} = \frac{1}{\frac{p}{q} + \left(1 - \frac{p}{q}\right)\frac{N-1}{N}} \qquad (2)$$

which is $$T_l = T_{FR} \cdot R_l \qquad (3)$$

where $T_l$ is the long intermediate frame (p frame) interval, $T_{FR}$ is the interval of a desired output frame, and N is the total number of bits in an output frame.

The interval of he short frame as shown in FIG. 3 is decreased to $$T_s = T_{FR} \frac{1}{\frac{p}{q}\frac{N}{N-1} + \left(1 - \frac{p}{q}\right)} \qquad (4)$$

which is $$T_s = T_{FR} \cdot R_s \qquad (5)$$

where $T_s$ is the short ((q-p) frame) intermediate frame interval.

For each of the long frames, the data transport capacity is M+1 bits and the nominal incoming data for each of the long frames is $M \cdot R_l$ bits. The immediate stuffing ratio, $S_l$, for the long frame then becomes $$S_l = 1 - M(R_l - 1) \qquad (6)$$

For each of the short frames, the data tansport capacity is M bits and the nominal incoming data rate for each of the short frames is $M \cdot R_s$. The immediate stuffing ratio, $S_s$, for the short frame then becomes $$S_s = M(1 - R_s) \qquad (7)$$

The average stuffing ratio over the intermediate multi-frame is $$S_{av} = \frac{p}{q} S_l + \frac{q-p}{q} S_s = \frac{p}{q} \qquad (8)$$

It is noted that neither $S_l$ nor $S_s$ is exactly $S_{av}$ though they are close to it.

Consider an example where a stuffing ratio of ½ is desired for asynchronous DS1 accommodation for a synchronous output at an output clock rate CLKOUT of 1.664 MHz. Then, p/q=½, N=832 (FIG. 1), M=772 (FIG. 1), and CLKINT=1.663 MHz (equation 1).

The asynchronizer stuffing unit 201 (FIG. 2) generates, under control of CLKINT and intermediate formatter 204, an intermediate multi-frame having two (2) frames (FIG. 3). One of the intermediate frames is a long (p) frame with 832 bits and one of the intermediate frames is a short frame with 831 bits.

The stuffing ratio for a frame can be defined as the data bit transport capacity for the frame less the actual number of data bits supplied to the frame. For each long frame, the data transport capacity (FIG. 3) is M+1 or 773 bits, while the actual number of data bits supplied during each long frame is 772.464. Consequently, the actual stuffing ratio for the long frame from equation 6 is $S_l$=0.536. Similarly, for each short frame, the data transport capacity is M or 772 bits, while the actual number of data bits supplied is 771.536. Consequently, the actual stuffing ratio for the short frame from equation 7 is $S_s=0.464$. Thus, the average stuffing ratio over the intermediate multi-frame is $S_{av}=0.5$, which is the desired stuffing ratio $p/q=\frac{1}{2}$.

Figure 5:
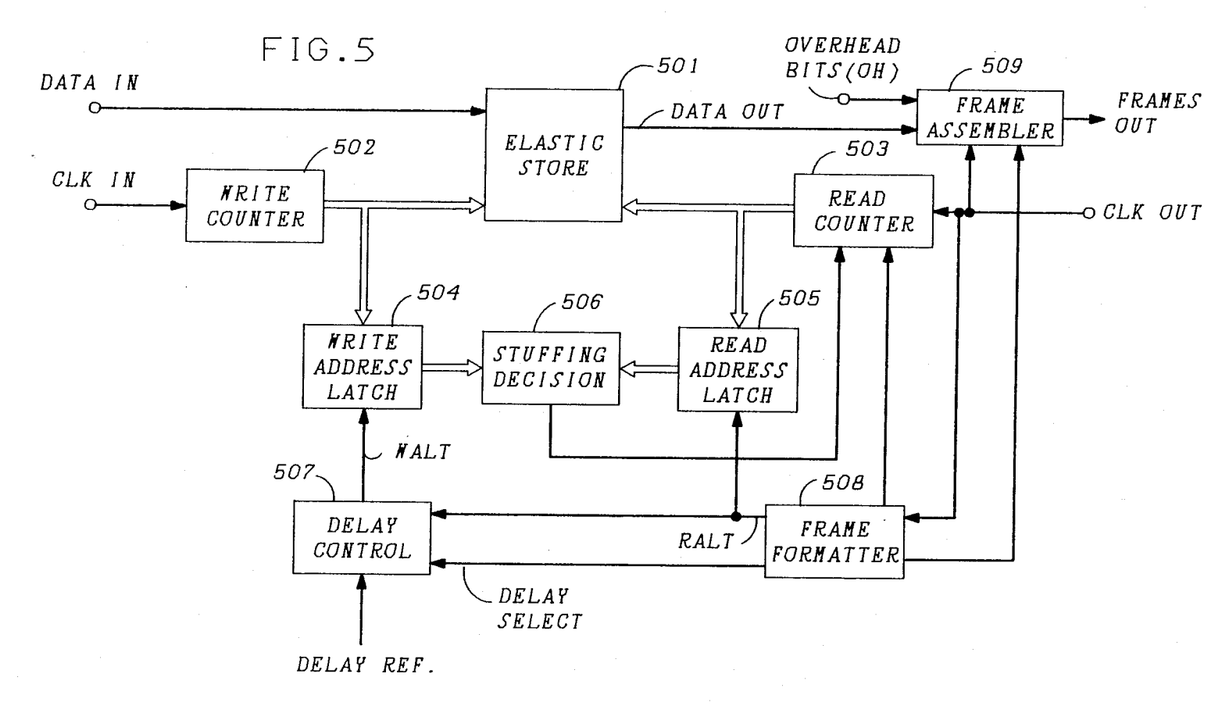
FIG. 5 depicts in simplified block diagram form details of another embodiment of the invention that includes an elastic store for obtaining a desired fractional stuffing ratio which yields an acceptable waiting time jitter value.

FIG. 5 shows in simplified block diagram form details of another embodiment of the invention for obtaining a desired fractional stuffing ratio for the frame format of FIG. 1. In this example, it is also assumed that the input data is the DS1 PCM signal having an input clock rate CLKIN of 1.544 MHz and that the output clock rate CLKOUT is 1.664 MHz. Accordingly, shown is elastic store 501 to which data is written in via DATA IN and data is read out via DATA OUT. Writing of data into elastic store 501 is controlled by write addresses generated by write counter 502 in response to input clock signal CLKIN. Again, in this example, CLKIN is nominally 1.544 MHz. Write address latch 504 is also supplied with the write addresses from write counter 502 and is employed to latch, i.e., store, the write address from counter 502 at a specific instant in response to signal WALT. That is to say, the write address stored in write address latch 504 is the one at a specific write address latching time (WALT). Similarly, reading data out of elastic store 501 is controlled by read addresses generated by read counter 503 in response to output clock signal CLKOUT. Again, in this example, CLKOUT is 1.664 MHz. Read address latch 505 is also supplied with the read addresses from read counter 503 and is employed to latch, i.e., store, the read address from counter 503 at a specific instant in response to signal RALT. That is to say, the read address stored in read address latch 505 is the one at a specific read address latching time (RALT). The addresses stored in write address latch 504 and read address latch 505 are compared in stuffing decision unit 506 to determine whether a bit should be stuffed or not. An output from stuffing decision unit 506 is supplied to read counter 503 for controlling stuffing. Read counter 503 is also responsive to an output from frame formatter 508 for controlling the data output from elastic store 501 as appropriate to form desired output frames in conjunction with frame assembler 509. Delay control unit 507 generates the write address latching time (WALT) signal based on a delay reference signal and under control of the read address latching time (RALT) signal and a delay select signal from frame formatter 508. The delay reference signal could be the input clock CLKIN or the output clock CLKOUT. If a delay line is used in delay control unit 507 no delay reference signal is required.

A decision whether to stuff or not is made in stuffing decision unit 506 during each frame. Heretofore, the stuffing decision was made every frame by simultaneously latching the write and read addresses at a fixed time and, then, comparing them. Simultaneous latching of the write and read addresses at a fixed time in each frame, implies that the interval during which data is written into the elastic store is equal to the interval during which data is read out of the elastic store for each frame. If an address gap between the write address and the read address is below a predetermined threshold, a decision to stuff is made, otherwise no stuffing occurs.

Desired output frames are generated by frame assembler 509. To this end, frame assembler 509 is supplied with overhead bits (OH) and the data out from elastic store 501. Assembler 509 under control of frame formatter 508 and CLKOUT generates output frame as shown in simplified form in FIG. 4 and, for a specific example, as shown in simplified form in FIG. 6.

In the embodiment of FIG. 5, a desired fractional asynchronous stuffing ratio is obtained by controlling elastic store 501 to read out data in such a manner that an output multi-frame format is obtained from assembler 509 as shown in simplified form in FIG. 4. If the write address and read address were latched simultaneously at a fixed time, as heretofore, the immediate stuffing ratios for the d-frames and x-frames are one (1) and zero (0), respectively. However, if the write address latching time (WALT) can be adjusted, in accordance with an aspect of the invention, relative to the read address latching time (RALT), a variation in the write interval into the elastic store 501 for a frame is obtained. Consequently, the number of input data bits written into elastic store 501 for the frame varies. This variation of the number of data bits being written into elastic store 501 is turned to account, in accordance with an aspect of the invention, to obtain a desired fractional stuffing ratio.

In general, let WALT and RALT be aligned in time at the end of the last previous multi-frame cycle. Then, for the first d-frame in the multi-frame, the WALT is delayed by $(1-p/q)$ UI of the asynchronous input clock CLKIN while RALT is not altered. Consequently, the write interval into elastic store 501 is increased. A UI is a unit interval which corresponds to one clock pulse. Then, the nominal input data rate is written into elastic store 501 during the increased write interval increases to $M+(1-p/q)$ bits while the number of data bits read out of elastic store 501 remains fixed at $M+1$ bits. Consequently, the immediate stuffing ratio $S_d$ for the d-frame becomes $p/q$. For the next d-frame, the WALT is delayed by $2(1-p/q)$ UI with respect to RALT, thereby providing a net increase of the write interval of $(1-p/q)$ UI. Continuing in this manner, the WALT for th p-th d-frame is delayed by $p(1-p/q)$ UI relative to RALT. For the $(p+1)$-th frame, i.e., the first x-frame, the WALT is advanced by $p/q$ UI with respect to the previous, i.e., p-th, WALT to generate a total delay of $p(1-p/q)-p/q$ UI. Thus, for this x-frame, the write interval is decreased by $p/q$ UI relative to the read interval and the nominal number of input data bits written into elastic store 501 is $M-p/q$ bits. The number of data bits read out of elastic store 501 for this x-frame is $M$ bits. Therefore, the immediate stuffing ratio $S_x$ for the x-frame becomes $p/q$. This advancing of the WALT by $p/q$ UI for each x-frame continues until the q-th frame. At the q-th frame any difference in time between the occurrence of WALT and RALT vanishes, and WALT and RALT are time aligned for the beginning of another multi-frame cycle.

As a specific example, if CLKOUT is used for a WALT delay/advance reference, the stuffing ratio $S_d$ of the d-frame and the stuffing ratio $S_x$ of the x-frame become $$S_d = 1 - \frac{M}{N}\left(1 - \frac{p}{q}\right) \tag{9}$$

and $$S_x = \frac{M}{N} \frac{p}{q}, \text{ respectively.} \tag{10}$$

This follows since one UI of the output clock signal CLKOUT is equivalent to M/N UI of the input clock signal CLKIN. Then, the average stuffing ratio over the multi-frame becomes $$S_{av} = \frac{p}{q} S_d + \frac{q-p}{q} S_x = \frac{p}{q} \quad (11)$$

Figure 6:
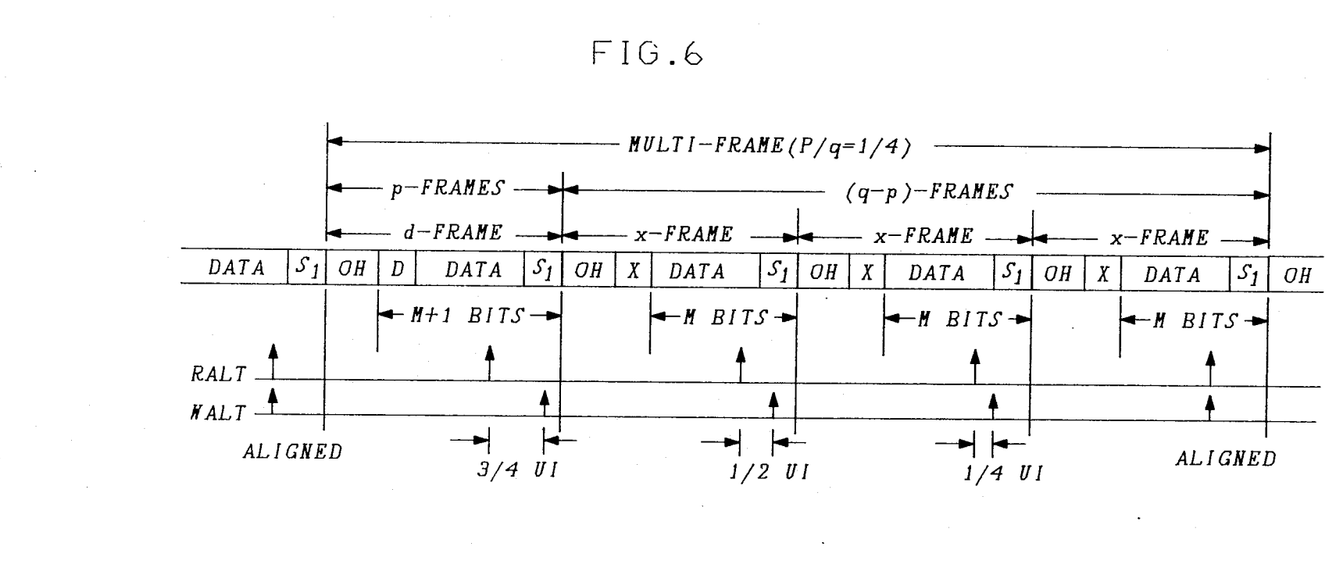
FIG. 6 illustrates in simplified form another multi-frame and the relationship between the write address latching time and the read address latching time in the embodiment of FIG. 5 to obtain a desired fractional stuffing ratio of $\frac{1}{4}$.

Operation of the embodiment shown in FIG. 5 in obtaining a desired fractional asynchronous stuffing ratio for the frame format of FIG. 1 can best be explained by way of a specific example. Accordingly, let us consider the DS1 PCM signal accommodation example again, however, with an asynchronous fractional stuffing ratio of p/q=¼. The desired relationship between WALT and RALT for an output multi-frame including a data bit being inserted in one stuffing bit position for p d-frames and a non-data bit being inserted in one stuffing bit position for p-q x-frames is illustrated in FIG. 6. Thus, under control of frame formatter 508 and delay control unit 507, WALT is aligned with RALT at the end of a last previous multi-frame cycle. Again, in this example, the delay reference supplied to delay control unit 507 is the output clock signal CLKOUT. Then, for the d-frame, a data bit is forced to be in one of the stuffing bit positions, namely, D (FIG. 6), the other stuffing bit position, S1, is stuffed or not depending on the decision made in stuffing decision unit 506. The RALT causes the read address being generated by read counter 503 to be latched at a fixed time in read address latch 505. Delay control unit 507 in response to RALT and a delay select signal from frame formatter 508, and to CLKOUT causes WALT to be delayed by ¾ UI, namely, 3p/q UI of the CLKOUT. Consequently, the write interval for the d-frame has been increased by ¾ UI of the CLKOUT. Thus, the immediate stuffing ratio $S_d$ for the d-frame, from equation 9, is 0.304. For the next frame in the multi-frame, i.e., the first x-frame, the delay of WALT relative to RALT is advanced under control of frame formatter 508 and CLKOUT so that the relative delay between WALT and RALT is now 2/4 UI, namely, 2p/q UI of the CLKOUT. Consequently, the write interval has been decreased relative to the read interval by ¼ UI, namely, p/q UI of the CLKOUT. Similarly, for the next x-frame, the delay of WALT relative to RALT is again advanced so that the relative delay is now ¼ UI, namely, p/q UI of the CLKOUT. Again, the write interval has been decreased by ¼ UI, namely, p/q UI of the CLKOUT. For the final x-frame, the delay of WALT relative to RALT is again advanced so that their is no delay between WALT and RALT. Here again, the write interval has been decreased ¼ UI of the CLKOUT. WALT and RALT are again aligned in time for the beginning of another multi-frame cycle. Thus, the immediate stuffing ratio $S_x$ for the x-frames from equation 10 is 0.232. The average stuffing ratio $S_{av}$ for the multi-frame from equation 11 is 0.25 or p/q=¼.

What is claimed is:

1. A synchronizer in which digital signals at a first transmission bit rate are synchronized by use of bit stuffing to a second higher transmission bit rate for transmission in an output frame format, comprising, means for obtaining a predetermined fractional stuffing ratio for output frames from said synchronizer, said means for obtaining including means for controllably varying in a prescribed manner intervals during which data bits are being inputted into said synchronizer, wherein a fractional stuffing ratio is obtained.

2. The synchronizer as defined in claim 1 wherein said means for varying includes means for increasing in a first prescribed manner the duration of a first predetermined number of intervals during which data bits are being inputted into said synchronizer.

3. The synchronizer as defined in claim 2 wherein said means for varying further includes means for decreasing in a second prescribed manner the duration of a second predetermined number of intervals during which data bits are being inputted into said synchronizer.

4. The synchronizer as defined in claim 3 wherein said means for obtaining further includes means for adjusting the data transport capacity of output framers from said synchronizer.

5. The synchronizer as defined in claim 4 wherein said means for adjusting includes means for inserting a data bit in a predetermined one of stuffing bit positions occurring during each of said first predetermined number of intervals.

6. The synchronizer as defined in claim 5 wherein said means for adjusting further includes means for inserting a non-data bit in a predetermined one of stuffing bit positions occurring during each of said second predetermined number of intervals.

7. The synchronizer as defined in claim 6 wherein said intervals are frame intervals and said first predetermined number of intervals and said second predetermined number of intervals form a multi-frame having a predetermined total number of frames equal to the sum of said first and second predetermined numbers.

8. The synchronizer as defined in claim 7 wherein said fractional stuffing ratio is obtained for said multi-frame and is equal to said first predetermined number divided by said predetermined total number.

9. A synchronizer in which digital signals at a first transmission bit rate are synchronized by use of bit stuffing to a second higher transmission bit rate for transmission in an output frame format, comprising,
   an asynchronous stuffing stage for generating intermediate frames,
   means associated with said asynchronous stuffing stage for controllably increasing the nominal number of incoming data bits accommodated for a first predetermined number of said intermediate frames and for controllably decreasing the nominal number of incoming data bits accommodated for a second predetermined number of said intermediate frames, and
   a synchronous stuffing stage supplied with said intermediate frames for generating output frames each having a predetermined number of bits, wherein a fractional stuffing ratio is obtained.

10. The synchronizer as defined in claim 9 wherein said means for controllably increasing and decreasing includes means for inserting a data bit in a stuffing bit position in said first predetermined number of intermediate frames and means for eliminating a stuffing bit position from said second predetermined number of intermediate frames.

11. The synchronizer of claim 10 wherein said first and second predetermined number of frames form an intermediate multi-frame having a total number of intermediate frames equal to the sum of said first and second predetermined numbers.

12. The synchronizer of claim 11 wherein an output clock rate having a first predetermined rate is employed to read bits out of said synchronous stuffing stage and an intermediate clock rate having a second predetermined rate which is less than and in prescribed relationship to said first predetermined bit rate is used to read bits out of said asynchronous stuffing stage.

13. The synchronizer as defined in claim 12 further including means associated with said synchronous stuffing stage for controllably inserting a non-data bit into the eliminated stuffing bit position in said second predetermined number of intermediate frames to form said output frames.

14. A synchronizer in which digital signals at a first transmission bit rate are synchronized by use of bit stuffing to a second higher transmission bit rate for transmission in an output frame format, comprising,
an elastic store,
means for controlling writing incoming data bits into said elastic store,
means for controlling reading data bits out of said elastic store, and
means for controlling stuffing of bits into stuffing bit positions,
said means for controlling writing including means for controllably increasing the duration of a first predetermined number of intervals during which data bits are written into said elastic store and for controllably decreasing the duration of a second predetermined number of intervals during which data bits are written into said elastic store, wherein a fractional stuffing ratio is obtained.

15. A synchronizer as defined in claim 14 wherein said means for controlling stuffing includes means for controllably inserting a data bit in a stuffing bit position occurring during each of said first predetermined number of intervals and for inserting a non-data bit in a stuffing bit position occurring during each of second predetermined number of intervals.

16. A synchronizer as defined in claim 15 wherein said means for controlling reading includes means for generating read addresses of memory locations in said elastic store out of which data bits are being read and read storing means for controllably storing the one of said read addresses being generated at a prescribed time during said intervals, wherein said means for controlling writing further includes means for generating write addresses of memory locations in said elastic store into which data bits are being written and means for controllably storing a write address, and wherein said write storing means for controlling increasing and decreasing includes means for controlling said write storing means to store a write address at prescribed instants relative to the storing of said read address so that said increasing and decreasing is effected.

17. A synchronizer as defined in claim 16 wherein said data bits are read out of said elastic store in predetermined output frame intervals and said one of the read addresses is stored in said read storing means at a fixed time during each of said output frame intervals and said first predetermined number and said second predetermined number form a multi-frame having a total number of output frames equal to the sum of said first and second predetermined numbers.

18. The synchronizer as defined in claim 17 wherein said fractional stuffing ratio is obtained for said multi-frame and is equal to said first predetermined number divided by said predetermined total number.

19. A method of synchronizing digital signals at a first transmission bit rate by use of bit stuffing to a second higher transmission bit rate for transmission in an output frame format, comprising the steps of,
increasing the duration of a first predetermined number of intervals during which incoming data bits are written into a bit stuffing synchronizer, and
decreasing the duration of a second predetermined number of intervals during which incoming data bits are written into said bit stuffing synchronizer, wherein a fractional stuffing ratio is obtained.

20. The method as defined in claim 19 further including the steps of inserting a data bit in a stuffing bit position occurring during each of said first predetermined number of intervals, and inserting a non-data bit in a stuffing bit position occurring during each of said second predetermined number of intervals.

* * * * *